(12) United States Patent
Choi et al.

(10) Patent No.: US 10,040,439 B2
(45) Date of Patent: Aug. 7, 2018

(54) METHOD TO COORDINATE PROPULSION TORQUE ACTUATORS THROUGH TORQUE LIMITS

(71) Applicant: GM GLOBAL TECHNOLOGY OPERATIONS LLC, Detroit, MI (US)

(72) Inventors: Tayoung Choi, Rochester, NY (US); Anthony H. Heap, Ann Arbor, MI (US); Krunal P Patel, Sterling Heights, MI (US); Steven M Hessell, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 375 days.

(21) Appl. No.: 14/862,214

(22) Filed: Sep. 23, 2015

(65) Prior Publication Data

US 2016/0257292 A1 Sep. 8, 2016

Related U.S. Application Data

(60) Provisional application No. 62/129,376, filed on Mar. 6, 2015.

(51) Int. Cl.
*B60W 10/06* (2006.01)
*B60W 10/08* (2006.01)
(Continued)

(52) U.S. Cl.
CPC ............ *B60W 10/08* (2013.01); *B60K 6/365* (2013.01); *B60K 6/445* (2013.01); *B60W 10/06* (2013.01);
(Continued)

(58) Field of Classification Search
CPC .... B60W 10/06; B60W 10/08; B60W 10/115; B60W 20/11; B60W 2540/10;
(Continued)

(56) References Cited

U.S. PATENT DOCUMENTS 7,606,649 B2 10/2009 Sato
2005/0182526 A1* 8/2005 Hubbard ............... B60K 6/445
701/1

(Continued)

FOREIGN PATENT DOCUMENTS

CN 1695976 A 11/2005
CN 101363373 A 2/2009
(Continued)

*Primary Examiner* — Huan G Le
(74) *Attorney, Agent, or Firm* — Quinn IP Law

(57) ABSTRACT

A powertrain system employing multiple propulsion torque actuators is described. A method for controlling the powertrain system includes interpreting a driver request, including determining a driver torque request and a regenerative braking request based upon driver inputs to an accelerator pedal and a brake pedal. A desired request is determined based upon the driver torque request and the regenerative braking request. Torque limits for the powertrain system are coordinated based upon the desired request, the driver torque request, and a previous driver torque request to determine upper and lower output torque limits, and the upper and lower output torque limits are combined with system constraints to generate a final torque request. The final torque request is employed to determine torque commands for the propulsion torque actuators, and the propulsion torque actuators are controlled based upon the torque commands for the propulsion torque actuators.

13 Claims, 4 Drawing Sheets

(51) Int. Cl.
*B60K 6/365* (2007.10)
*B60K 6/445* (2007.10)
*B60W 10/115* (2012.01)
*B60W 20/11* (2016.01)

(52) U.S. Cl.
CPC ........... *B60W 10/115* (2013.01); *B60W 20/11* (2016.01); *B60W 2540/10* (2013.01); *B60W 2540/12* (2013.01); *B60Y 2200/92* (2013.01); *B60Y 2300/42* (2013.01); *B60Y 2300/43* (2013.01); *B60Y 2300/60* (2013.01); *Y02T 10/6239* (2013.01); *Y02T 10/6286* (2013.01); *Y10S 903/93* (2013.01)

(58) Field of Classification Search
CPC ........... B60W 2540/12; B60Y 2300/43; B60Y 2300/60; B60K 6/365; B60K 6/445
See application file for complete search history.

(56) References Cited

U.S. PATENT DOCUMENTS

| | | | |
|---|---|---|---|
| 2005/0256623 | A1 | 11/2005 | Hubbard et al. |
| 2009/0118950 | A1* | 5/2009 | Heap .................. B60K 6/365 701/55 |
| 2011/0125352 | A1* | 5/2011 | McGrogan ........... B60W 10/06 701/22 |
| 2012/0059539 | A1 | 3/2012 | Arnett et al. |
| 2012/0158225 | A1* | 6/2012 | Books .................. B60W 10/06 701/22 |

FOREIGN PATENT DOCUMENTS

| | | |
|---|---|---|
| CN | 101508293 A | 8/2009 |
| DE | 102012209200 A1 | 12/2012 |
| JP | 2011167030 A | 8/2001 |
| JP | 2014069785 A | 4/2014 |

\* cited by examiner

| 430 | 416 | | | | | | |
|---|---|---|---|---|---|---|---|
| | | 0 | 1.5 | 3 | 4 | 5 | 6 | 8 |
| 213 | -100 | 1 | 0.5 | 0 | -0.5 | -0.75 | -1 | -1.5 |
| | -80 | 1 | 0.625 | 0.25 | 0 | -0.5 | -0.75 | -1.2 |
| | -60 | 1 | 0.75 | 0.5 | 0.25 | 0 | -0.5 | -0.8 |
| | -40 | 1 | 0.825 | 0.75 | 0.5 | 0.25 | 0 | -0.5 |
| | -20 | 1 | 0.9 | 0.875 | 0.8 | 0.5 | 0.5 | 0 |
| | -10 | 1 | 0.95 | 0.925 | 0.9 | 0.875 | 0.75 | 0.5 |
| | 0 | 1 | 1 | 1 | 1 | 1 | 1 | 1 |

METHOD TO COORDINATE PROPULSION TORQUE ACTUATORS THROUGH TORQUE LIMITS

CROSS-REFERENCE TO RELATED APPLICATIONS

This application claims priority to and the benefit of U.S. Provisional Patent Application No. 62/129,376, filed on Mar. 6, 2015, which is hereby incorporated by reference in its entirety.

TECHNICAL FIELD

This disclosure relates to powertrain systems employing multiple torque-generative devices and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, drivability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating mode and gear shifting, controlling the torque-generative devices, and regulating the electrical power interchange among the electrical energy storage device and the electric machines to manage outputs of the transmission, including torque and rotational speed.

SUMMARY

A powertrain system employing multiple propulsion torque actuators is described. A method for controlling the powertrain system includes interpreting a driver request, including determining a driver torque request and a regenerative braking request based upon driver inputs to an accelerator pedal and a brake pedal. A desired request is determined based upon the driver torque request and the regenerative braking request. Torque limits for the powertrain system are coordinated based upon the desired request, the driver torque request, and a previous driver torque request to determine upper and lower output torque limits, and the upper and lower output torque limits are combined with system constraints to generate a final torque request. The final torque request is employed to determine torque commands for the propulsion torque actuators, and the propulsion torque actuators are controlled based upon the torque commands for the propulsion torque actuators.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
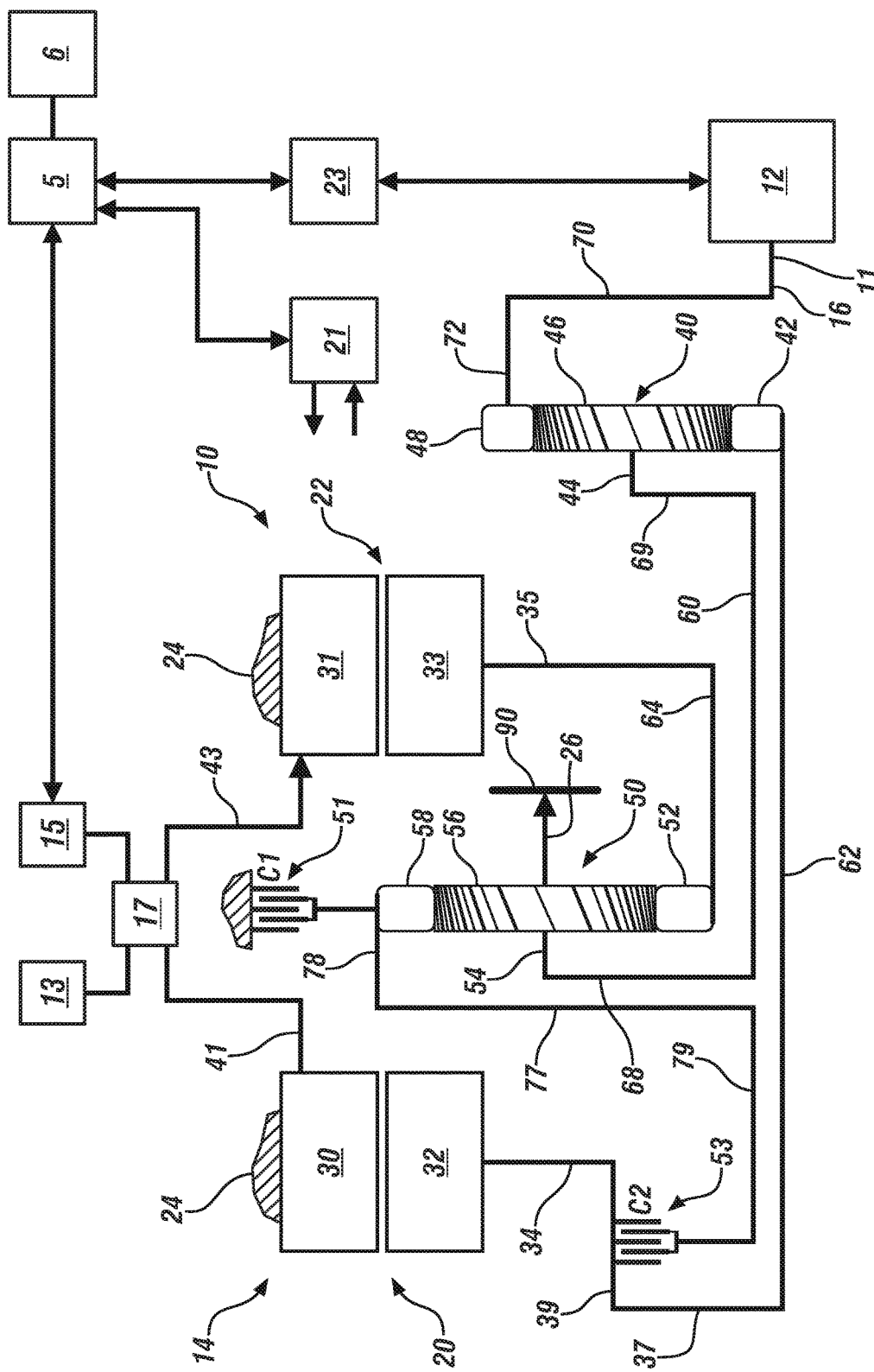
FIG. 1 schematically illustrates a powertrain system that includes an internal combustion engine and multi-mode transmission that couples to a driveline, the operation of which is controlled by a hybrid control module, in accordance with the disclosure.

Referring now to the drawings, wherein the showings are for the purpose of illustrating certain exemplary embodiments only and not for the purpose of limiting the same, FIG. 1 schematically illustrates elements of a powertrain system 10 including an internal combustion engine (engine) 12 and multi-mode transmission (transmission) 14 that couples to a driveline 90, the operation of which is controlled by a hybrid control module (HCP) 5. The powertrain system 10 is representative of a powertrain system that employs multiple propulsion torque actuators, including, e.g., the engine 12, first and second torque machines 20, 22, respectively, and torque transfer clutches, e.g., first clutch 51 and a second clutch 53.

The internal combustion engine (engine) 12 includes a rotating crankshaft 11 that rotatably couples to an input member 16 of the transmission 14. As described herein, the rotating crankshaft 11 couples to the input member 16 of the transmission 14 such that rotation of the crankshaft 11 causes a corresponding rotation of the input member 16. Mechanisms through which the crankshaft 11 fixedly couples to the input member 16 include, by way of non-limiting examples, a direct shaft that couples rotations of the crankshaft 11 and the input member 16, meshingly engaged gears that couple rotations of the crankshaft 11 and the input member 16, sprockets and a chain that couple rotations of the crankshaft 11 and the input member 16, or pulleys and a belt that couple rotations of the crankshaft 11 and the input member 16. Furthermore, the crankshaft 11 may couple to the input member 16 through an intervening clutch, torque converter device or other device that is capable of decoupling rotation of the engine crankshaft 11 from the corresponding rotation of the input member 16 of the transmission 14.

The transmission 14 includes first and second planetary gear sets 40, 50, respectively, having elements that rotatably couple to the first and second torque machines 20, 22, respectively. Planetary gear set 40 includes sun gear 42, carrier member 44 and ring gear 48. The carrier member 44 rotatably supports a plurality of pinion gears 46 that mesh with the sun gear 42, and the ring gear 48 meshes with the pinion gears 46. Planetary gear set 50 includes sun gear 52, carrier member 54 that rotatably supports a plurality of pinion gears 56 that mesh with the sun gear 52, and the ring gear 58 meshes with the pinion gears 56. Rotor hub 35 rotates in concert with the sun gear 52 through an intermediate sleeve shaft 64. In one embodiment and as described herein, the transmission 14 is an electro-mechanical transmission device wherein the first and second torque machines 20, 22 are electrically powered motor/generators. It is appreciated that the torque machines may instead employ hydraulic power, pneumatic power, or another suitable power source to generate torque within the scope of the concepts described in this disclosure. It is further appreciated that the concepts described herein are not limited to transmissions employing only first and second simple planetary gear sets, but may also advantageously apply to transmissions employing any plurality of simple or complex planetary gear sets or other gear train configurations.

The first torque machine 20 and the second torque machine 22 are packaged within a case housing/ground 24 and rotatably couple between the input member 16 and a transmission output member 26 that reacts with the driveline 90. The first torque machine 20 includes an annular stator 30 grounded to the transmission casing 24 and an annular rotor 32 supported on a rotatable rotor hub 34. The second torque machine 22 includes an annular stator 31 grounded to the transmission casing 24 and an annular rotor 33 supported on a rotatable rotor hub 35. A high-voltage battery 13 supplies electric power to a power inverter 17 that electrically connects with the first stator 30 via transfer conductors 41 to control operation thereof. The power inverter 17 also electrically connects with the second stator 31 via transfer conductors 43 to control operation of the second torque machine 22 to control operation. The first and second torque machines 20, 22 may operate as motors or generators. Either of the first and second torque machines 20, 22 may operate as an electric motor in which stored electrical power provided by the battery 13 is converted by the power inverter 17 and provided to the respective stator 30, 31 to generate torque. Either of the first and second torque machines 20, 22 may operate as an electric generator in which vehicle momentum may be converted to electrical power stored in the battery 13 or used by the second torque machine 22.

The transmission 14 further includes the first clutch 51 and the second clutch 53. The first clutch 51 is a grounding clutch or brake that is selectively activated to ground the ring gear member 58 to the transmission casing 24. The input member 16 is axially spaced from and not concentric with shaft 60, which couples the carrier member 44 of the first planetary gear set 40 and the carrier member 54 of the second planetary gear set 50. Shaft 72 is preferably coaxial with the input member 16, which couples to hub member 70 to couple with the input member 16 for common rotation with the ring gear 48. Shaft 62 couples rotor hub 34 with sun gear 42 via hub member 37 and an axially-extending portion 39. The second clutch 53 nests between an axially extending portion 39, hub 37 and shaft 62. A hub member 77 couples with the second clutch 53. A separate sleeve shaft 60 concentric with shaft 62 couples carrier member 54 and hub members 68 and 69 to carrier member 44, and thus fixedly couples rotation of the carrier member 44 to rotation of the carrier member 54. Sleeve shaft 64 couples rotor hub 35 with sun gear 52. Axially-extending member 78, hub 77 and axially-extending member 79, which is an annular shaft, couples the second clutch 53 with the first clutch 51 and ring gear 58. Axial-extending member 78 circumscribes the planetary gear set 50. The ring gear member 58 decouples from the sun gear member 42 when the second clutch 53 is deactivated.

The transmission 14 selectively operates in fixed-gear modes and variable modes, with the variable modes being electrically-variable modes in one embodiment. Transmission operation in a fixed-gear mode includes any operation wherein the rotational speed of the output member 26 is a direct ratio of the rotational speed of the input member 16. The transmission 14 operates in one fixed-gear mode at a first gear ratio by activating both the first and second clutches 51, 53. The transmission 14 operates in an engine-off fixed-gear mode at a second gear ratio by activating the first clutch 51 in combination with the engine 12 being in an OFF state under conditions as described herein. The first gear ratio and the second gear ratio may be determined based upon the gear ratios of the first and second planetary gear sets 40, 50. Transmission operation in one of the variable modes includes any operating condition wherein the rotational speed of the output member 26 is determined based upon the speed of the input member 16 in combination with rotational speeds of the first and second torque machines 20, 22, the gear ratios of the planetary gear sets 40, 50, activation states of the first and second clutches 51, 53 and other factors.

The HCP 5 communicates with an engine control module (ECM) 23, the inverter controller 15, and a transmission control module (TCM) 21, along with other devices. The HCP 5 provides supervisory control over the ECM 23 and the inverter controller 15 and an operator interface device 6 that receives commands from a vehicle driver. The HCP 5 coordinates torque commands between the engine 12 and the first and second torque machines 20, 22 to control output torque in response to a driver torque request that is input to the operator interface device 6, with such coordination described by the control routine 200 described with reference to FIGS. 2 and 4-6 and more specifically to the control routine 300 described with reference to FIG. 3. The operator interface device 6 includes one or a plurality of devices through which the operator commands operation of the vehicle and powertrain system, including, e.g., an accelerator pedal, a brake pedal, an ignition key, a transmission range selector, cruise control, and other related devices. The operator interface device 6 generates commands for operating the powertrain system, including, e.g., a powertrain ON/OFF state, a transmission range selection, e.g., one of Park, Reverse, Neutral and Drive, the driver torque request, and other related commands. The powertrain system 10 generates an output torque that is delivered to the vehicle wheels through the driveline 90 in response to the driver torque request and other inputs to the operator interface device 6. The operator interface device 6 is shown as a unitary device for ease of illustration.

The power inverter module 17 preferably includes a pair of power inverters and respective motor control modules configured to receive torque commands and control inverter states therefrom for providing motor drive or electric power regeneration functionality to meet the motor torque commands. The power inverters include complementary three-phase power electronics devices, and each includes a plurality of insulated gate bipolar transistors (IGBTs) or other suitable power switching devices for converting DC power from the battery 13 to AC power for powering respective ones of the first and second torque machines 20, 22 by switching at high frequencies. The IGBTs form a switch mode power supply configured to receive control commands. Each phase of each of the three-phase electric machines includes a pair of IGBTs. States of the IGBTs are controlled to provide motor drive mechanical power generation or electric power regeneration functionality. The three-phase inverters receive or supply DC electric power via DC transfer conductors and transform it to or from three-phase AC power, which is conducted to or from the first and second torque machines 20, 22 for operation as motors or generators via transfer conductors. The inverter controller 15 controls the power inverter module 17 to transfer electrical power to and from the first and second torque machines 20, 22 in response to the motor torque commands. Electrical current is transferred across the high-voltage electrical bus to and from the battery 13 to charge and discharge the battery 13.

The ECM 23 operatively connects to the engine 12, and functions to acquire data from sensors and send actuator commands to the engine 12 over a plurality of discrete lines or other suitable communication links. The ECM 23 monitors engine speed and load, which are communicated to the HCP 5. The inverter controller 15 monitors and controls a first motor torque of the first torque machine 20 and a second motor torque of the second torque machine 22. Alternatively, two electronic controllers can be utilized, with each controller monitoring respective ones of the first and second torque machines 20, 22, respectively. The TCM 21 monitors rotational speeds and controls activation and deactivation of the first and second clutches 51, 53.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communication between controllers, and communication and between controllers, actuators and/or sensors may be accomplished using a direct wired link, a networked communication bus link, a wireless link or another suitable communication link. Communication includes exchanging data signals in any suitable form, including, for example, electrical signals via a conductive medium, electromagnetic signals via air, optical signals via optical waveguides, and the like. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Torque output from the powertrain system may lag a driver torque request during transient or directional changes of the driver torque request, with the lag resulting in degradation in drive quality. There may be four different scenarios of driver-intended maneuvers when considering directional changes of the driver torque request in combination with a present torque command. The scenarios include a positive-rising maneuver, a positive-falling maneuver, a negative-rising maneuver and a negative-falling maneuver, wherein "rising" refers to an accelerator pedal tip-in, "falling" refers to an accelerator pedal tip-out, "positive" refers to an output torque greater than zero, i.e., for forward propulsion, and "negative" refers to an output torque less than zero, i.e., for braking. The driver-intended maneuvers may be accompanied by poor coordination of propulsion torque actuators, e.g., when one or more of the propulsion torque actuators is limited by a system constraint. Such directional changes may lead to driveline lash transitions, which may cause driveline clunk. Driveline lash refers to play between meshed elements in the driveline 90 due to clearances between the meshed elements, tolerance stacking, and other factors. Clunk refers to audible and other physically discernible actions in the driveline that are caused when the driveline 90 transitions from transferring torque in a first direction to transferring torque in a second, opposed direction, e.g., transitioning from transferring torque in an acceleration state to transferring torque in a deceleration state.

FIGS. 2 and 4-6 schematically show details of the torque control routine 200, which coordinates propulsion torque actuator commands, including in response to a directional change in a driver torque request. The torque control routine 200 acts to improve vehicle drive quality by calculating output torque ranges for each maneuver, applying output torque shaping prior to calculation of ranges but before applying constraints, using maneuvers to determine when to employ the driver accelerator pedal busyness metric or fast quiescence as a quantifier for the maneuvers. This includes classifying the maneuvers into four quadrants that can be independently evaluated. In operation, the torque control routine 200 coordinates the propulsion torque actuator commands including the engine torque command, the motor torque commands and clutch inertia constraints in one embodiment. The torque control routine 200 may be implemented to control an embodiment of the powertrain system 10 described with reference to FIG. 1. Alternatively, the torque control routine 200 may be implemented to control other powertrain systems that employ multiple propulsion torque actuators. Alternatively, the torque control routine 200 may be implemented to control other powertrain systems that employ propulsion torque actuators that include an internal combustion engine and transmission clutches.

Figure 2:
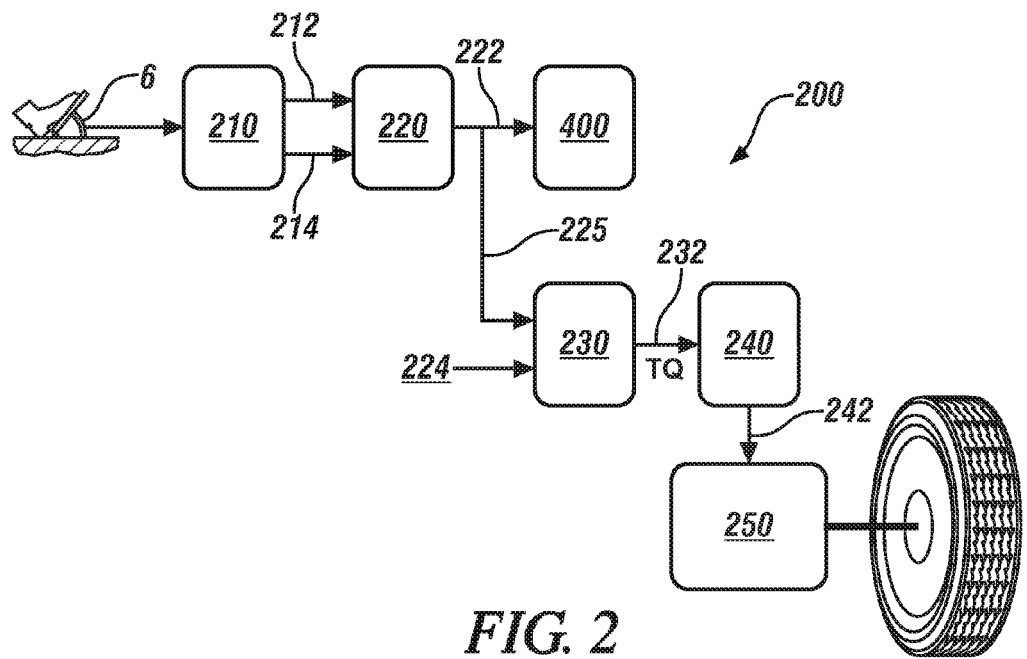
FIGS. 2 through 6 schematically show details of a torque control routine to coordinate propulsion torque actuator commands in response to a directional change in the driver torque request to improve vehicle drive quality in accordance with the disclosure.

As best shown with reference to FIG. 2 an overview of the torque control routine 200 includes a routine to interpret driver request 210, a routine to calculate a desired request 220, a routine to coordinate torque limits 400, a routine to apply output torque limits 230, a routine to determine actuator commands 240, and a routine to apply actuator commands 250. The routine to interpret driver request 210 operates by interpreting the driver's input(s) to the accelerator pedal and the brake pedal that are communicated via the operator interface device 6, including determining a driver torque request 212 and a regenerative braking request 214. The driver torque request 212 is determined based upon driver input to the accelerator pedal. The regenerative braking request 214 is a vehicle braking torque request that is implemented through the powertrain system 10 by transferring reactive torque from the first and second electric machines 20, 22 to the driveline 90. The regenerative braking request 214 is determined in response to a driver input to the accelerator pedal that is either an accelerator pedal tip-out or coasting command, and a driver input to the brake pedal, which may be accomplished by regenerative braking in combination with a braking torque command exerted through vehicle wheel brakes.

The routine to calculate a desired request 220 evaluates and combines the driver torque request 212 and the regenerative braking request 214 to determine a desired request 222. The desired request 222 represents the driver torque request 212 that has been modified and shaped based on a propulsion characterization that specifies and accounts for the capability of the powertrain system 10 to deliver torque to the driveline and accounts for the regenerative braking request 214.

Figure 4:
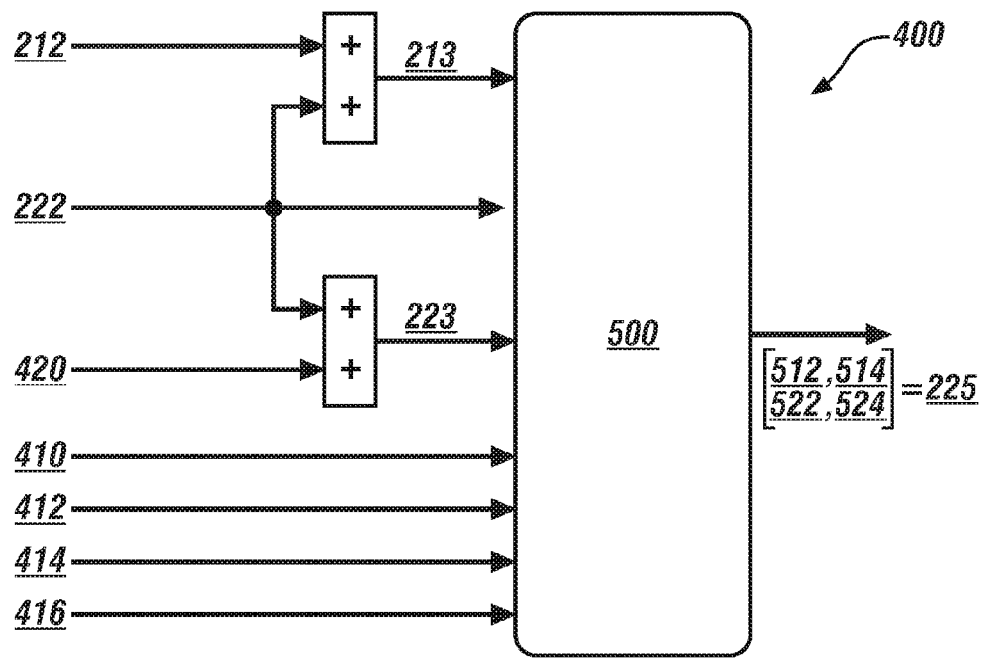
Figure 5:
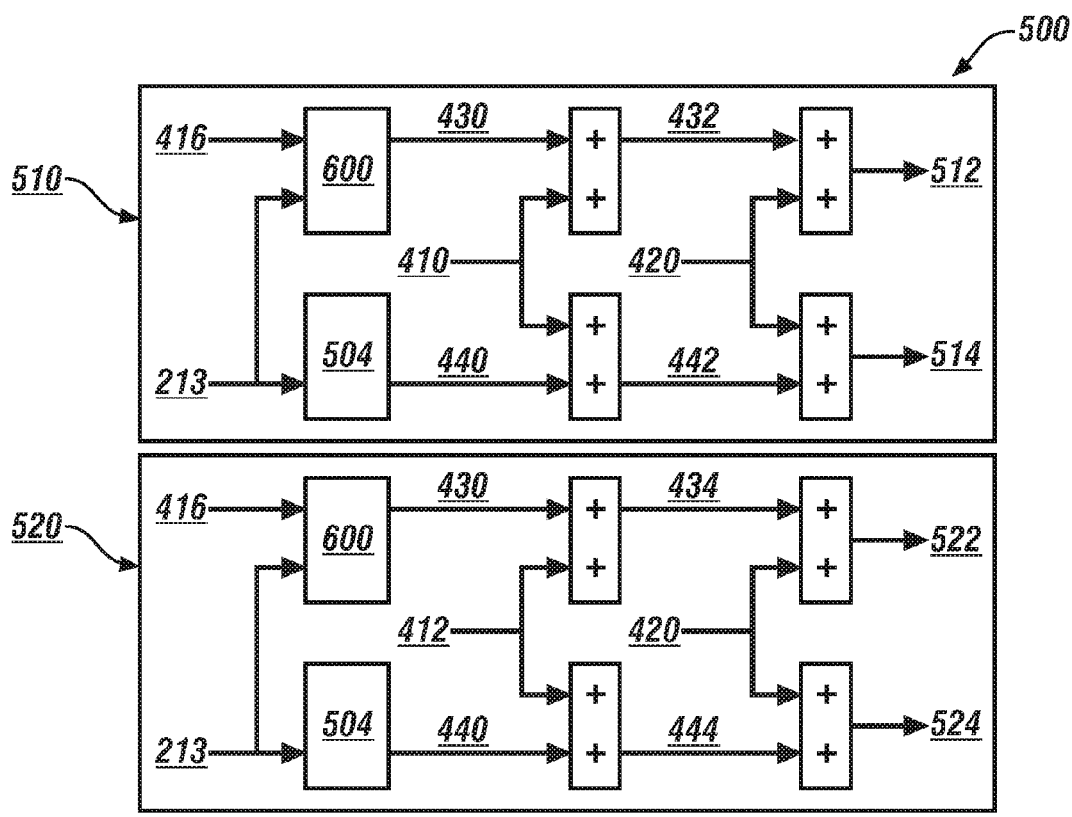
Figures 6, 7:
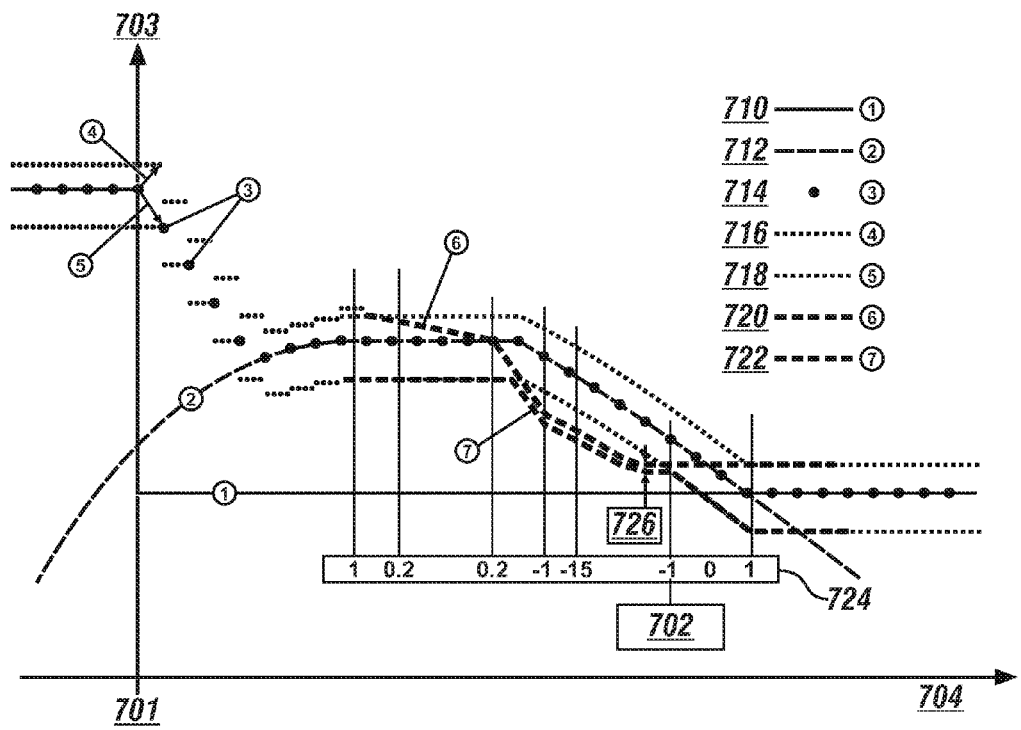
FIG. 7 graphically shows operation of a vehicle including a powertrain system while executing the torque control routine described with reference to FIGS. 2-6, with the vehicle operation being an accelerator pedal tip-out maneuver while the vehicle is operating in a positive torque condition, in accordance with the disclosure.

The routine to coordinate torque limits 400 employs the desired request 222 to determine and coordinate output torque limits 225 for the propulsion torque actuators as described in FIGS. 4-6. The output torque limits 225 for the propulsion torque actuators include upper and lower output torque limits.

The routine to apply output torque limits 230 combines the upper and lower output torque limits with system constraints 224 through arbitration or another routine and applied to the desired request 222 to generate a final torque request 232. The system constraints 224 capture and reflect physical and operational capabilities of the various elements of the system, and preferably include mechanical yield stresses, electrical loading capabilities, battery states of charge, and other such constraints.

The routine to determine actuator commands 240 employs the final torque request 232 to determine actuator commands 242 for the various propulsion torque actuators including, depending upon the embodiment of the powertrain system on which the routine 200 is deployed, the engine 12, the first and second electric machines 20, 22, and the clutch(es) activation(s) and other inertial devices.

The routine to apply actuator commands 250 employs the actuator commands 242 to control the actuators to generate propulsion torque that is responsive to the driver torque request 212. The torque control routine 200 is preferably periodically executed, e.g., once every 12.5 msec during ongoing vehicle operation.

The driver torque request 212 is provided as input to a routine 400 to coordinate output torque limits, which is best shown with reference to FIGS. 4, 5 and 6. The output torque is the magnitude of torque that is delivered to the vehicle wheels through the driveline 90.

The coordinate torque limits routine 400 includes coordinating a plurality of system-monitored inputs and internal limits to determine upper and lower output torque limits, employing a coordinating routine 500 that is best shown with reference to FIG. 5. The inputs include the driver torque request 212, the desired request 222, a previous output torque command 410, an upper gradient margin 410, a lower gradient margin 412, a maneuver direction 414, and a measure of driver quiescent time 416. The previous output torque command 410 is an output torque command determined from a previous iteration of the torque control routine 200.

The upper gradient margin 410 represents a maximum allowable increase in the output torque for the next iteration of the torque control routine 200, and the lower gradient margin 412 represents a maximum allowable decrease in the output torque for the next iteration of the torque control routine 200. The maneuver direction 414 indicates a change in the driver torque request 212 from the previous iteration, with a rising maneuver indicating the driver torque request 212 is increasing from the previous iteration and a falling maneuver indicating the driver torque request 212 is decreasing from the previous iteration. The driver quiescent time 416 indicates an elapsed time since the driver torque request 212 has changed in magnitude. Thus, a low value for the driver quiescent time 416 indicates recent accelerator pedal motion and a high value for the driver quiescent time 416 indicates substantial time has elapsed since accelerator pedal motion has occurred.

FIG. 5 schematically shows the coordinating routine 500, including details for coordinating the system-monitored inputs and internal limits to determine the upper and lower output torque limits in response to a rising maneuver or a falling maneuver. This includes a first routine 510 that is employed in response to a rising maneuver, i.e., when the driver torque request 212 is increasing from the previous iteration as indicated by the maneuver direction 414. The first routine 510 employs a first difference 213 between the driver torque request 212 and the desired request 222 and the driver quiescent time 416 to determine a first calibration value K1 430. FIG. 6 illustrates, in tabular form, one embodiment of an example table 600 that includes a plurality of allowable K1 values 430 that may be selected based upon the first difference 213 between the driver torque request 212 and the desired request 222 and the driver quiescent time 416. The first calibration value K1 430 is combined with an absolute value of the upper gradient margin 410 to generate a resultant 432 that is added to the driver torque request from the previous iteration 420 to determine an upper output torque limit for the rising maneuver 512. A second difference 223 between the driver torque request from the previous iteration 420 and the desired request 222 is employed to determine a second calibration value K2 440, which is a calibratable scalar offset from the selected K1 value 430. The second calibration value K2 440 is combined with an absolute value of the upper gradient margin 410, and that resultant 442 is subtracted from the driver torque request 212 from the previous iteration to determine the lower output torque limit for the rising maneuver 514.

A second routine 520 is employed in response to a falling maneuver, i.e., when the driver torque request 212 is decreasing from the previous iteration as indicated by the maneuver direction 414. The second routine 520 employs the magnitude of difference 213 between the driver torque request 212 and the desired request 222 and the driver quiescent time 416 to determine the first calibration value K1 430. FIG. 6 illustrates, in tabular form, one embodiment of an example table 600 that includes a plurality of allowable K1 values 430 that may be selected based upon the magnitude of difference 213 between the driver torque request 212 and the desired request 222 and the driver quiescent time 416. The first calibration value K1 430 is combined with an absolute value of the lower gradient margin 412, and that resultant 434 is subtracted from the driver torque request from the previous iteration 420 to determine a lower output torque limit for the falling maneuver 524. The magnitude of difference 213 between the driver torque request 212 and the desired request 222 is employed to determine the second calibration value K2 440, which is a calibratable scalar offset from the selected K1 value 430. The second calibration value K2 440 is combined with the absolute value of the lower gradient margin 412, and that resultant 444 is added to the driver torque request 212 from the previous iteration to determine the upper output torque limit for the rising maneuver 522.

Referring again to FIG. 2, the routine to apply output torque limits 230 combines the output torque limits 225, i.e., one of upper and lower output torque limits 512, 514, respectively or 522, 524 respectively, with the system constraints 224 through arbitration or another routine, with the resultant applied to the desired request 222 to generate a final torque request 232. The routine to determine actuator commands 240 employs the final torque request 232 to determine actuator commands 242 for the various propulsion torque actuators, and the routine to apply actuator commands 250 employs the actuator commands 242 to control the actuators to generate propulsion torque that is responsive to the driver torque request 212.

The actuator commands 242 are applied to the torque actuators to generate propulsion torque that is responsive to the driver torque request 212 but constrained within the upper and lower output torque limits. This may include an engine torque command, an electric machine torque command, and clutch and inertial torque commands in one embodiment. The engine torque command may be provided to an engine torque control module for implementation, which determines the magnitude of engine torque achieved. A difference between the engine torque command and the engine torque achieved may be sent as a feed-forward engine torque.

The driver torque request 212, regenerative braking request 214 and feedback motor torque commands are combined to determine a shaped or desired driver request.

As such, desired driver request(s), hardware limitations such as clutch capacity limits, inertial effects, and torque capabilities of the torque actuators are combined and constrained by limits imposed on the engine 12 and the first and second torque machines 20, 22 by battery power and motor torque limits. The torque commands 242 are responsive to the driver torque request 212 but takes into account the various constraints and limitations imposed thereon to minimize driver dissatisfaction. In this manner, engine and motor torque commands and clutch inertia constraints are coordinated to improve drive quality during a directional change in the driver's input(s) to the accelerator pedal and the brake pedal including the driver torque request 212 and the regenerative braking request 214.

Figure 3:
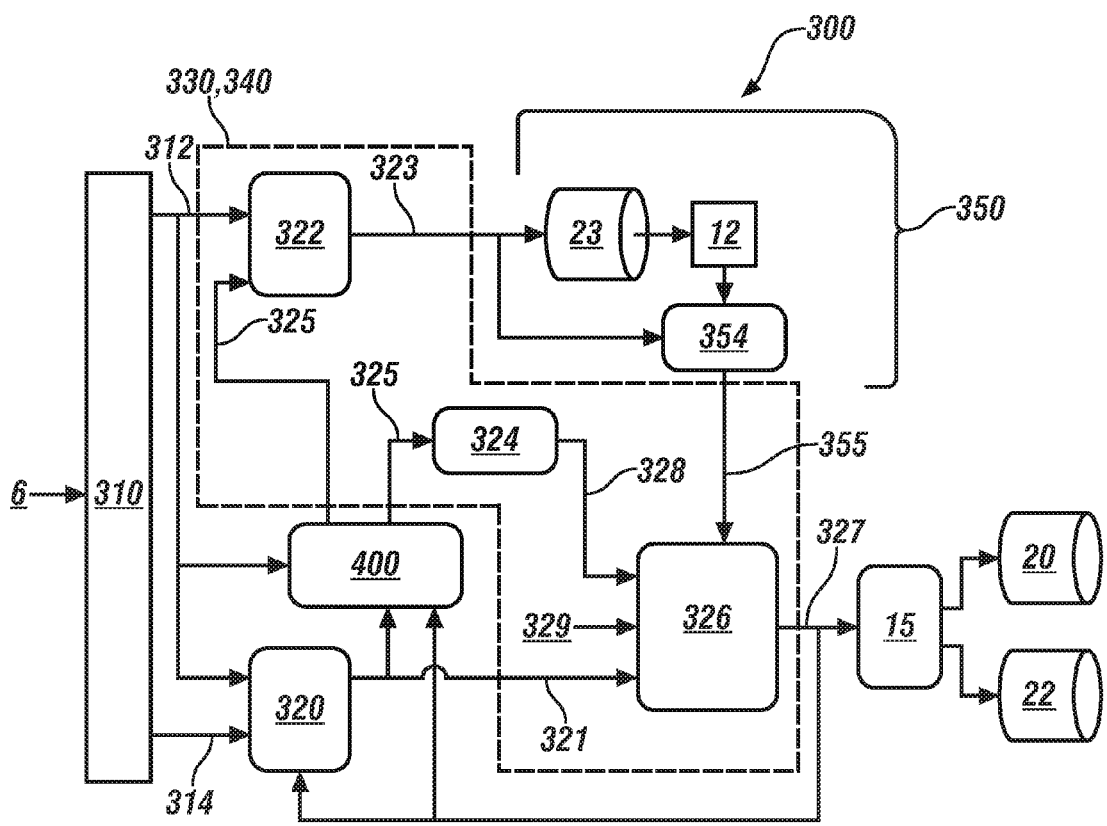

FIG. 3 schematically shows torque control routine 300, which is an embodiment of the torque control routine 200 described herein that is applied to the powertrain system 14 described with reference to FIG. 1. The torque control routine 300 includes a driver request interpretation routine 310, routine to calculate a desired request 320, the routine to coordinate torque limits 400, a routine to apply output torque limits 330, a routine to determine actuator commands 340, and a routine to apply actuator commands 350. The driver request interpretation routine 310 and the routine to calculate a desired request 320 are analogous to the corresponding routines 210, 220 described with reference to FIG. 2, and the coordinate torque limits routine 400 is described with reference to FIGS. 4 through 6 to determine output torque limits 325 for the propulsion torque actuators that include upper and lower torque limits.

The driver request interpretation routine 310 interprets the driver's input(s) to the accelerator pedal and the brake pedal to determine driver torque request 312 and a regenerative braking request 314. The routine to calculate desired request 320 evaluates and combines the driver torque request 312 and the regenerative braking request 314 to determine a desired request 321, which represents the driver torque request 312 that has been modified and shaped based on a propulsion characterization that specifies and accounts for the capability of the powertrain system 10 to deliver torque to the driveline 90 and accounts for the regenerative braking request 314.

The routine to coordinate torque limits 400 employs the desired request 321 and the driver torque request 312 to determine and coordinate output torque limits 325 for the propulsion torque actuators as described in FIGS. 4-6. The output torque limits 325 for the propulsion torque actuators include upper and lower output torque limits.

The routine to apply output torque limits 330 is combined with the routine to determine actuator commands 340, and includes an engine torque command routine 322, a clutch inertia control routine 324, and a motor torque control routine 326. The engine torque command routine 322 determines an engine torque command 323 that is responsive to the driver torque request 312 as constrained by the output torque limits 325. The engine torque command 323 is communicated to the ECM 23 to control operation of the engine 12. The engine controller 23 provides information that is evaluated by an engine torque achieved routine 354 to determine a feed-forward engine torque term 355.

The clutch inertia control routine 324 determines clutch capacity limits and inertia torque command 328 that is constrained by the output torque limits 325, and is preferably executed in the TCM 21. The motor torque control routine 326 determines motor torque commands 327 for the first and second electric machines 20, 22 that are responsive to the desired request 321 and account for the feed-forward engine torque term 355, the clutch capacity limits and inertia torque command 328 and battery power limits 329 associated with a state of charge and a charging capacity of the high-voltage battery 13. The motor torque commands 327 are communicated to the inverter controller 15, which determines motor torque commands for the first and second electric machines 20, 22 based thereon.

Thus, the desired driver request, clutch capacity limits, inertial command, and feed-forward engine torque are combined and constrained by limits imposed on the first and second torque machines 20, 22 by battery power and motor torque limits to determine the motor torque commands 327 that are responsive to the driver torque request 312 but takes into account the various constraints and limitations imposed thereon to minimize driver dissatisfaction. In this manner, engine and motor torque commands and clutch inertia constraints are coordinated to improve drive quality during a directional change in the driver torque request 312, including managing the output torque to minimize occurrence of driveline clunk.

FIG. 7 graphically shows operation of a vehicle including a powertrain system, e.g., an embodiment of the powertrain system 10 described with reference to FIG. 1, while executing the torque control routine 200 described with reference to FIGS. 2-6. Torque is indicated on the vertical axis 703, in relation to time, which is indicated on the horizontal axis 704. The vehicle operation includes a driver torque request 212 that includes an accelerator pedal tip-out maneuver while the vehicle is operating in a positive torque condition, also referred to as a positive-falling condition. The tip-out maneuver occurs at timepoint 701. Data includes the driver torque request 710, an effective minimum output torque limit 712, a final torque request 714, upper gradient margin 716, lower gradient margin 718, upper output torque limit 720 and lower output torque limit 722, all shown in relation to time on the horizontal axis. Also shown nominally on the graph are values for K1 724 and K2 726. As shown, the final torque request 714 iteratively steps down in response to the tip-out, limited by the lower gradient margin 718. The effective minimum output torque limit 712 continues to increase, indicating inertial response of the vehicle or due to the battery power limits. After several iterations indicated by the steps, the final torque request 714 begins to coincide with the effective minimum output torque limit 712, and maneuvering starts as the driver quiescence time is accumulated due to a steady pedal angle indicated by the driver torque request 710, allowing the upper output torque limit 720 and lower output torque limit 722 to engage and be employed for output torque shaping. The shaping occurs and control happens until to maneuver ends with the final torque request 714 matching the driver torque request 710, which occurs as indicated at timepoint 702. Thus, drive quality may be improved during powertrain response to a directional change in the driver torque request through coordinated commands for the propulsion torque actuators. Using busyness of the driver's pedal, which relates to quiescence time and a difference between the request and the current commanded torque, the upper and lower torque limits are maneuvered to coordinate the propulsion torque actuators. By way of example, steadiness of a driver torque request coupled with a large magnitude of difference between the driver torque request and a current torque command results in an improved ability to coordinate the upper and lower limits to satisfy the driver torque request in a coordinated fashion. The torque control routine 200 may be employed to control various powertrain configurations, including, for example, a hybrid powertrain system employing an internal combustion engine and two electric machines by controlling the engine using engine spark and air actuation, controlling the transmission inertia, and controlling motor torque commands. The torque control routine 200 may be employed in a hybrid system employing an internal combustion engine and a single electric machine by controlling the engine using engine spark and air actuation, and controlling the motor torque command. The torque control routine 200 may be employed in a powertrain configuration employing only an internal combustion engine by controlling the engine using engine spark and air actuation.

During directional changes of the driver torque request such as accelerator pedal tip-in or tip-out maneuvers that may lead to lash transitions, the system may lag longer than necessary in matching the driver torque request due to poor coordination of propulsion torque actuators, especially when limited by a system constraint. As such, the torque control routine 200 uses an unconstrained shaped output torque command as a target torque for all the propulsion torque actuators in the current processor loop. The driver-intended maneuver is identified based on a difference between the torque request and command torque, and the busyness of the accelerator pedal, also referred to as quiescence. The driver-intended maneuver is employed to alter the rate at which each of the propulsion torque actuators responds if held by a system constraint. Such operation improves drive quality by dynamically adjusting torque shaping and actuator torque ranges based on a calculated driver intended maneuver, pedal busyness (quiescence) and state of driver torque request relative to the system constraints. This operation should induce faster torque response from engine and clutch capacity when it is necessary to provide requested torque at the transmission. This operation slows the application of driver request if a constraint that has been limiting the application of this torque for some time is suddenly removed. Thus flexible torque management is provided.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or another programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a powertrain system including a plurality of propulsion torque actuators, the method comprising:
   interpreting a driver request, including determining a driver torque request and a regenerative braking request based upon driver inputs to an accelerator pedal and a brake pedal;
   determining a desired request based upon the driver torque request and the regenerative braking request;
   coordinating torque limits for the powertrain system based upon the desired request, the driver torque request, and a previous driver torque request to determine upper and lower output torque limits;
   combining the upper and lower output torque limits with system constraints to generate a final torque request;
   employing the final torque request to determine torque commands for the propulsion torque actuators; and
   controlling, via a controller, the propulsion torque actuators based upon the torque commands for the propulsion torque actuators.

2. The method of claim 1, wherein interpreting the driver request, including determining the driver torque request and the regenerative braking request based upon driver inputs to the accelerator pedal and the brake pedal comprises interpreting the driver request as one of a positive-rising maneuver, a positive-falling maneuver, a negative-rising maneuver and a negative-falling maneuver, wherein rising indicates an accelerator pedal tip-in, falling indicates an accelerator pedal tip-out, positive indicates an output torque greater than zero, and negative indicates an output torque less than zero.

3. The method of claim 1, wherein coordinating the output torque limits for the powertrain system further comprises coordinating the output torque limits for the powertrain system based upon the desired request, the driver torque request, the previous driver torque request and a quiescent time associated with the driver input to the accelerator pedal.

4. The method of claim 3, wherein coordinating the output torque limits for the powertrain system based upon the desired request, the driver torque request, the previous driver torque request and the quiescent time associated with the driver input to the accelerator pedal comprises:
  determining an upper gradient margin in response to an accelerator pedal tip-in;
  selecting a first calibration value based upon the quiescent time, the desired request and the driver torque request;
  determining a second calibration value based upon the first calibration value; and
  determining the upper and lower output torque limits based upon the upper gradient margin, the first and second calibration values, and the previous driver torque request.

5. The method of claim 3, wherein coordinating the output torque limits for the powertrain system based upon the desired request, the driver torque request, the previous driver torque request and the quiescent time associated with the driver input to the accelerator pedal comprises
  determining a lower gradient margin in response to an accelerator pedal tip-out;
  selecting a first calibration value based upon the quiescent time, the desired request and the driver torque request;
  determining a second calibration value based upon the first calibration value; and
  determining the upper and lower output torque limits based upon the lower gradient margin, the first and second calibration values, and the previous driver torque request.

6. The method of claim 1, wherein combining the upper and lower output torque limits with system constraints to generate the final torque request comprises arbitrating the upper and lower output torque limits with the system constraints and the desired request to generate the final torque request.

7. A method for controlling a powertrain system including a plurality of propulsion torque actuators to transfer torque to a driveline in response to a directional change in a driver torque request, the method comprising:
  determining the directional change in the driver torque request and a regenerative braking request based upon driver inputs to an accelerator pedal and a brake pedal;
  determining a desired request based upon the driver torque request and the regenerative braking request;
  coordinating torque limits for the powertrain system based upon the desired request, the driver torque request, and a previous driver torque request to determine upper and lower output torque limits;
  combining the upper and lower output torque limits with system constraints to generate a final torque request;
  employing the final torque request to determine torque commands for the propulsion torque actuators; and
  controlling, via a controller, the propulsion torque actuators based upon the torque commands for the propulsion torque actuators.

8. The method of claim 7, wherein determining the directional change in the driver torque request and the regenerative braking request based upon driver inputs to the accelerator pedal and the brake pedal comprises interpreting the driver request as one of a positive-rising maneuver, a positive-falling maneuver, a negative-rising maneuver and a negative-falling maneuver, wherein rising indicates an accelerator pedal tip-in, falling indicates an accelerator pedal tip-out, positive indicates an output torque greater than zero, and negative indicates an output torque less than zero.

9. The method of claim 7, wherein coordinating the output torque limits for the powertrain system further comprises coordinating the output torque limits for the powertrain system based upon the desired request, the driver torque request, the previous driver torque request and a quiescent time associated with the driver input to the accelerator pedal.

10. The method of claim 9, wherein coordinating the output torque limits for the powertrain system based upon the desired request, the driver torque request, the previous driver torque request and the quiescent time associated with the driver input to the accelerator pedal comprises:
  determining an upper gradient margin in response to an accelerator pedal tip-in;
  selecting a first calibration value based upon the quiescent time, the desired request and the driver torque request;
  determining a second calibration value based upon the first calibration value; and
  determining the upper and lower output torque limits based upon the upper gradient margin, the first and second calibration values, and the previous driver torque request.

11. The method of claim 9, wherein coordinating the output torque limits for the powertrain system based upon the desired request, the driver torque request, the previous driver torque request and the quiescent time associated with the driver input to the accelerator pedal comprises
  determining a lower gradient margin in response to an accelerator pedal tip-out;
  selecting a first calibration value based upon the quiescent time, the desired request and the driver torque request;
  determining a second calibration value based upon the first calibration value; and
  determining the upper and lower output torque limits based upon the lower gradient margin, the first and second calibration values, and the previous driver torque request.

12. The method of claim 7, wherein combining the upper and lower output torque limits with system constraints to generate the final torque request comprises arbitrating the upper and lower output torque limits with the system constraints and the desired request to generate the final torque request.

13. A powertrain system, comprising:
  an internal combustion engine and first and second torque machines rotatably coupled to a torque transmission device including a selectively activated clutch; and
  a controller operatively connected to the internal combustion engine, the torque transmission device and the first and second torque machines, the controller including an instruction set, the instruction set executable to:
    interpret a driver request, including a driver torque request and a regenerative braking request based upon driver inputs to an accelerator pedal and a brake pedal, determine a desired request based upon the driver torque request and the regenerative braking request,
coordinate torque limits for the powertrain system based upon the desired request, the driver torque request, and a previous driver torque request to determine upper and lower output torque limits,
combine the upper and lower output torque limits with system constraints to generate a final torque request,
employ the final torque request to determine torque commands for the internal combustion engine and first and second torque machines, and
control the internal combustion engine, the first and second torque machines and the clutch of the torque transmission device based upon the torque commands for the internal combustion engine and first and second torque machines.

\* \* \* \* \*